Jan. 14, 1969 A. S. JACKSON 3,422,257

ANALOG COMPUTING APPARATUS WITH SYSTEM SCALING INDICATOR

Filed Feb. 17, 1966

INVENTOR
ALBERT S. JACKSON

BY

Christie, Parker & Hale
ATTORNEYS.

United States Patent Office 3,422,257

Patented Jan. 14, 1969

3,422,257
ANALOG COMPUTING APPARATUS WITH SYSTEM SCALING INDICATOR

Albert S. Jackson, Seal Beach, Calif., assignor to Milgo Electronic Corporation, Miami, Fla., a corporation of Florida Filed Feb. 17, 1966, Ser. No. 528,137

U.S. Cl. 235—193 5 Claims

Int. Cl. G06g *7/00;* H03k *5/20*

ABSTRACT OF THE DISCLOSURE

A system scaling indicator is provided for checking the magnitude scaling of selected components of an analog computer. An absolute value circuit is utilized to compare the absolute value of the amplitude of the output voltage of the computing component with a selected reference voltage representative of a predetermined percentage of the rated output voltage of the computing components. A visual indicator, e.g. a lamp, is actuated when the output voltage of the computing component exceeds the selected reference voltage.

*Background of the invention*

The present invention relates to analog computers and more particularly to analog computers having a system scaling indicator for selected components thereof.

Conventional analog computers are provided with an overload indicator for each of the analog computing components. This overload indicator which includes a warning lamp, informs the operator when the output voltage signal from any computing component has exceeded the rated output voltage during the problem solution. When the output voltage of an analog computing component exceeds the rated output voltage, the accuracy of the computing component is impaired, introducing an error into the solution obtained by the computer.

While the conventional overload indicator informs the operator that a particular component has been overloaded during the problem solution, it does not indicate over what portion of the dynamic range each computer component is operating. Thus some computer components may be operating only over a small portion of their available dynamic range. The accuracy of a computing component operating over only a small portion of its dynamic range, for example 20% or less, is lower than the accuracy of the same component operating over a large portion of its dynamic range. Where a computer is run with one or more of its components operating only over a small portion of its dynamic range, the resultant solution may not contain very significant lower order digits. If the operator knows that a computing component is operating over only a small portion of its dynamic range, he may rescale the component, for example, by changing the gain or the level of the input signal to the amplifier or amplifiers of the computing component. The operator thus has a need to know the approximate range in which each computing component will operate during the problem solution so that, if necessary, he may rescale the components before the actual problem is run to inusre that no components are operating over too small a portion of their dynamic range, and that no components are operating beyond their maximum effective dynamic range.

The above problems are solved by the present invention in which the analog computing apparatus is provided with a system scaling indicator to inform the operator before the actual problem is run which computing components are operating below any predetermined percentage of the rated output voltage. This permits the operator to rescale the programmed components if necessary, so that each component is operating above a predetermined percentage of its rated output voltage, (e.g. 25% or 50%) and below the maximum voltage during the problem solution.

*Summary of the invention*

In accordance with the invention, an analog computing apparatus is provided with a plurality of analog computing components with each of the components being adapted to produce an output voltage signal. A plurality of sources of reference voltages are provided in which each of the sources produces a different voltage which is representative of a predetermined percentage of the rated output voltage of the computing components. Means are provided for comparing the output voltage signals of each of the computing components with the selected reference voltage and means are associated with each computing component and coupled to the comparing means for indicating when the output voltage of the respective computing component exceeds the selected reference voltage.

*Brief description of the drawings*

The invention is described in more detail in connection with the accompanying drawing in which.

*Description of the preferred embodiment*

Figures 1, 2:
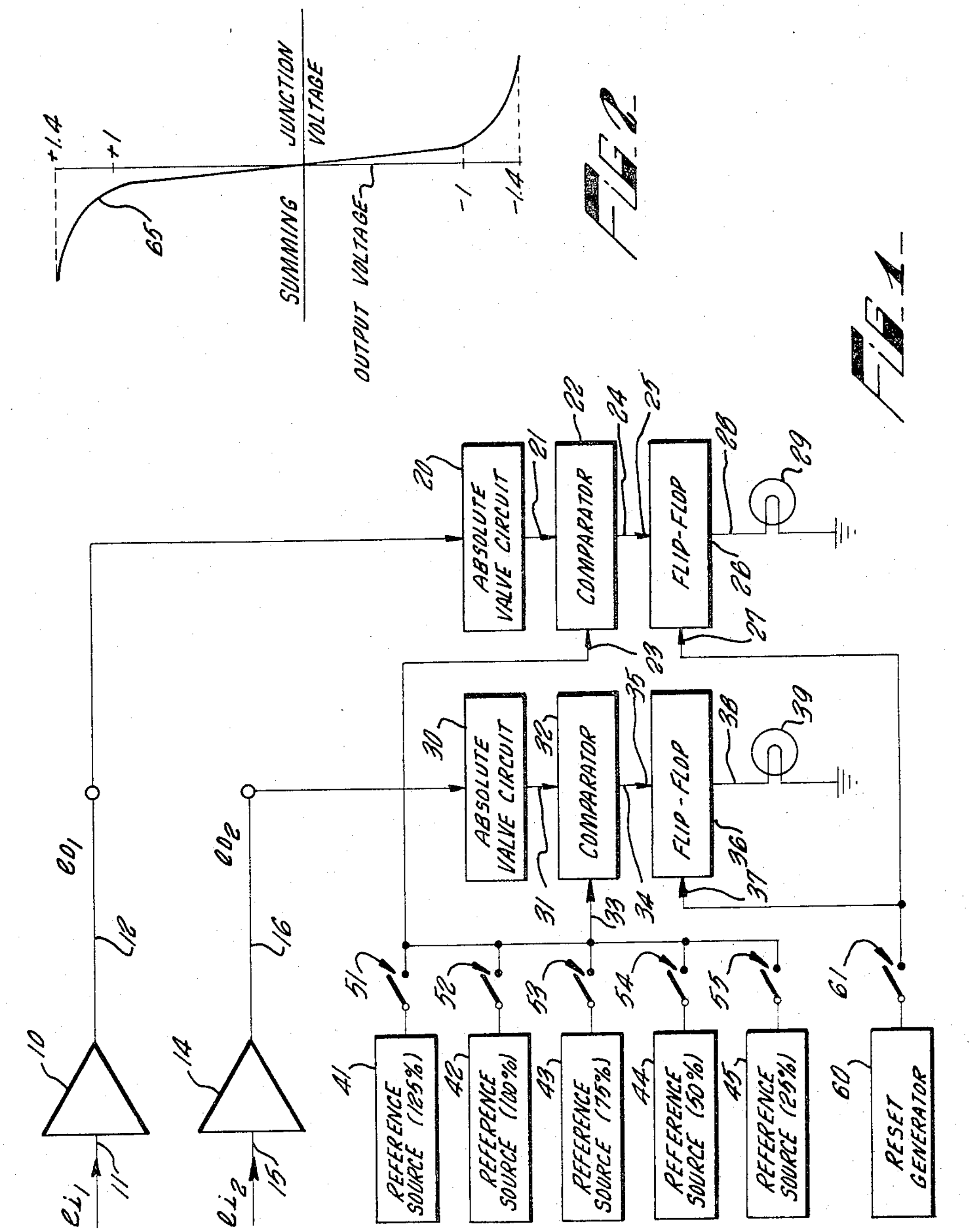
FIG. 1, is the block diagram of one circuit for carrying out the invention.
FIG. 2 is a characteristic curve of the change in output voltage plotted against the change in the summing junction voltage of a typical operational amplifier.

Referring now to FIG. 1, a first computing component 10 is illustrated with an input circuit 11 and an output circuit 12. The input signal applied to the circuit 11 is designated as $e_{i_1}$ and the output signal developed in the output terminal 12 is designated as $e_{o_1}$. A second computing component 14 includes an input circuit 15 and an output circuit 16. The input signal applied to the circuit 15 is designated by the reference $e_{i_2}$ and the signal developed in the output circuit is designated $e_{o_2}$.

The output circuit 12 of the computing component 10 is connected through an absolute value circuit 20 to a first input 21 of a comparator 22. The comparator includes a second input 23 and an output 24. The output of the comparator 22 is applied to a first input circuit 25 of a flip-flop 26 which includes a second input circuit 27 and an output circuit 28. The output circuit 28 of the flip-flop is connected to an indicator lamp 29.

The output circuit of the computing component 14 is coupled through a second absolute value circuit 30 to a first input 31 of a second comparator 32. The comparator 32 includes a second input 33 and an output 34. The output from the comparator 32 is connected to a first input circuit 35 of a flip-flop 36. The flip-flop 36 includes a second input circuit 37 and an output circuit 38 which is connected to a second indicator lamp 39. The absolute value circuits 20 and 30 provide an output signal of one polarity which has an instantaneous amplitude equal to or proportional to the instantaneous amplitude of the output signal from the computer components independently of the polarity of the computing component output signal. Such absolute value circuits are well known in the art and may, for example, utilize an inverter and a pair of diode gates for converting the varying polarity D.C. output signal from the computer components into a signal of one polarity having the same instantaneous amplitude.

The second input circuits 23 and 33 of the comparators are selectively connected to one of a plurality of sources of reference voltages 41, 42, 43, 44 and 45 by means of switches 51, 52, 53, 54 and 55, respectively. Each source of reference voltage produces a different reference voltage which is representative of a predetermined percentage of the rated output voltage of the computing components. For example, reference source 41 produces a reference voltage which is representative of 125% of the rated output voltage. Reference voltage sources 42, 43, 44, 45 produce reference voltages representative of 100%, 75%, 50% and 25% of the rated output voltage, respectively, as shown.

Each of the comparators 22 and 32 produce an output signal which switches the respective bistable flip-flops 26 and 36 from an initial state to a second state of operation only when the instantaneous amplitude of the signal applied to the first input thereof exceeds the amplitude of the signal applied to the second input thereof. The flip-flops 26 and 36 produce an output signal in this second state of operation which turns on indicating lamps 29 and 39. The flip-flops 26 and 36 may be reset to their initial state of operation by means of a reset generator 60 through a switch 61.

The computing components 10 and 14 may be operational amplifiers, multipliers, resolvers, function generators or other computing components utilized in the analog computer. The illustration of the two computing components in FIG. 1 is representative only of the large number of computing components that are utilized in the analog computer and for which it may be desired to check the output voltage against a preselected reference voltage. It should be noted that the term output voltage signal as used herein refers not only to the final output signal voltage produced by a computing component but also to intermediate voltages that are representative of the final output signal and which are checked against the reference voltages.

In operation the computing components 10 and 14 may be checked for overloading at any selected reference voltage by closing one of the switches 51 to 55 and operating the computer to run the programmed problem for a sufficient period of time to allow for reactions to unusual parameter excursions. For example, to check the computing components to determine whether or not the output voltage signal thereof exceeds 25% of the rated voltage, it is only necessary to close switch 55 and run the problem on the computer with the application of the input signals $e_{i_1}$ and $e_{i_2}$ to the programmed components for the given test period. The indicating lamps 29 and 39 will turn on only in the event that the instantaneous output or peak signal from the computing components 10 and 14, respectively, exceed 25% of the rated value during the test run. The output voltage signal from the computing components may be checked against 50% of the rated output voltage, 75% of the rated output voltage, 100% of the rated output voltage or 125% of the rated output voltage by connecting the appropriate reference source to the comparators 22 and 32.

The particular values of the reference voltages in terms of percentage of the rated output voltage of the computing component may vary. The number of reference voltage sources may also vary depending upon the needs for any particular computer.

In FIG. 2 there is illustrated a characteristic curve 65 of a typical operational amplifier in which the abscissa represents the voltage at the summing junction and the ordinate represents the output voltage of the amplifier. The $+1$ and $-1$ points on the ordinate represent 100% of the rated output voltage and between these points the output varies linearly with the input signal. If the amplifier is driven beyond $+1$ and $-1$ points on the ordinate axis, the output becomes distorted. However, the distortion introduced by operating the amplifier up to 125% of its rated output voltage is small. For this reason, the computer operator may wish to operate the component over a maximum range of 125% of the rated output voltage.

It should be noted that the indicating means, including the lamps 29 and 39, generate light to inform the operator that the output voltage signals from certain computing components have exceeded the selected reference voltage. The lack of any light output from the remaining indicating lamps also informs the operator that the output signal voltages of the remaining computing components have not exceeded the selected reference voltage. Thus the indicating means of the present invention may be arranged to turn indicating lamps on or off when the output voltage signals of the respective computing components have exceeded the selected reference voltage. In either case there will be a visual indication when the output voltage signals of any computing component has exceeded the selected reference voltage.

There has been disclosed an analog computer apparatus with a system scaling indicator which permits the operator to quickly determine whether or not any of the programmed computer components are operated beyond the desired maximum dynamic range or below the minimum desired dynamic range. This permits the operator to rescale one or more of the computing components to make sure that the maximum computer component accuracy is being utilized.

What is claimed is:

1. In an analog computing apparatus the combination comprising:
   (a) a plurality of analog computing components, each of the components being adapted to produce an output voltage signal,
   (b) a plurality of sources of reference voltages, each of the sources producing a different reference voltage which is representative of a predetermined percentage of the rated output voltage of the computing components,
   (c) comparing means for comparing the absolute value of the output voltage signals of each of the computing components with the reference voltage of a selected source, and
   (d) indicating means associated with each computing component coupled to the comparing means for indicating when the output voltage signal of the respective computing component exceeds said reference voltage.

2. The combination as defined in claim 1 wherein the indicating means includes a flip-flop and an indicator lamp connected to the output of each comparator for energizing the respective indicator lamp when the output voltage signal of the respective component exceeds said reference voltage.

3. The combination as defined in claim 1 wherein the plurality of sources of reference voltages includes a first source for producing a reference voltage which is representative of approximately 25% of the rated output voltage of the computing components, a second source for producing a reference voltage which is representative of approximately 50% of the rated output voltage of the computing components and a third source for producing a reference voltage which is representative of approximately 100% of the rated output voltage of the computing components.

4. In an analog computing apparatus the combination comprising:
   (a) a plurality of analog computing components, each of the components having an input circuit and an output circuit for developing an output voltage signal that is a function of the signal applied to the input circuit thereof,
   (b) at least two sources of reference voltages, each of the sources producing a different reference voltage which is representative of a predetermined percentage of the rated output voltage of the computing components,
   (c) comparing means individually associated with each computing component, each of the comparing means having a pair of inputs and an output and arranged to compare the absolute value of the amplitudes of the signals applied to the input thereof and produce an output signal when the amplitude of the signal applied to the first input exceeds, the amplitude of the signal applied to the second input thereof, (d) means for connecting the first input of each comparing means to the output circuit of the respective computing component, (e) means for selectively connecting the second input of each comparing means to each of the sources of reference voltage during succeeding time intervals, (f) separate indicating means individually connected to the output of each comparing means for providing a visual indication that the voltage output of the associated computing component has exceeded the selected reference voltage in response to the output signal from the respective comparing means.

5. The combination as defined in claim 4 wherein one of said sources produces reference voltage which is representative of approximately 25% of the rated output voltage of the computing components and another source produces a reference voltage which was representative of approximately 125% of the rated output voltage of the computing components.

References Cited

UNITED STATES PATENTS

| | | | |
|---|---|---|---|
| 2,913,181 | 11/1959 | Leeder | 235—194 |
| 3,112,805 | 12/1963 | Williams | 177—26 X |
| 3,138,705 | 6/1964 | Ross | 235—193 X |
| 3,196,418 | 7/1965 | Schneberger et al. | 324—99 X |
| 3,267,375 | 8/1966 | Olsen | 328—116 X |

MALCOLM A. MORRISON, *Primary Examiner.*

J. F. RUGGIERO, *Assistant Examiner.*

U.S. Cl. X.R.

328—116